TRAVELING WAVE AMPLIFIER HAVING AN UPSTREAM WAVE REFLECTIVE GAIN CONTROL ELEMENT

Filed April 22, 1968 2 Sheets-Sheet 1

INVENTOR.
KENNETH W. SLOCUM
BY
Robert W. Ditto
ATTORNEY

INVENTOR.
KENNETH W. SLOCUM
BY
Robert W. Dilts
ATTORNEY 3,538,377

TRAVELING WAVE AMPLIFIER HAVING AN UPSTREAM WAVE REFLECTIVE GAIN CONTROL ELEMENT

Kenneth W. Slocum, Ben Lomond, Calif., assignor to Varian Associates, Palo Alto, Calif., a corporation of California Filed Apr. 22, 1968, Ser. No. 723,042
Int. Cl. H01j 25/34
U.S. Cl. 315—3.6 5 Claims

ABSTRACT OF THE DISCLOSURE

A traveling wave tube amplifier is disclosed. The amplifier includes an electron gun for forming and projecting a stream of electrons over an elongated beam path to a beam collector electrode. A coupled cavity slow wave circuit is arranged along the electron beam path for electromagnetic interaction with the beam to produce an amplified output signal at the downstream end of the circuit. The circuit is made up of a number of severed slow wave circuit portions. The downstream severed circuit portion includes a plurality of coupled cavity sections with the downstream cavity section being coupled via a waveguide and wave permeable window to a suitable load for extracting the output signal. The upstream cavity of the output section is coupled to a resistive load to form a non-wave reflective resistive termination for absorbing backward traveling waves reaching the upstream end of the circuit. A wave reflective discontinuity, forming a gain control element, is disposed in the upstream cavity for reflecting a portion of a backward traveling wave on the slow wave circuit back along the circuit in the forward direction for controlling the gain of the tube. The gain control element preferably includes a conductive rod positioned substantially at the interaction gap of the upstream cavity, whereby gain fluctuations may be canceled over a relatively wide band of frequencies.

DESCRIPTION OF THE PRIOR ART

Heretofore, relatively high power high frequency traveling wave tube amplifiers have been built. Such traveling wave tube amplifiers have provided relatively high gain, on the order of 40 db, with relatively high output power on the order of 8 kilowatts CW at C-band, over a frequency range of from approximately 5.925 gigahertz to 6.425 gigahertz. Such tubes have been of the severed circuit variety wherein the slow wave circuit included two or three severed circuit portions resistively terminated at their ends to provide relatively high gain while minimizing certain unwanted oscillation.

When such tubes are designed to provide relatively high gain per periodic section of the slow wave circuit, i.e., with gain greater than 2 db per section, it is found that the gain characteristic of the tube has certain unwanted variations with frequency across the operating band of the tube. These gain variations are of a cyclical nature, there being N—1 gain peaks across the pass band of the circuit, where N is the number of periodic sections in the output circuit section of the tube. It is believed that these gain variations are due to the feedback of wave energy from the output end of the circuit to the severed upstream end of the severed output slow wave circuit section. The feedback is believed to be due to a backward traveling wave on the output circuit section. This backward traveling wave essentially couples energy from the output gap of the circuit, where the forward traveling wave has the highest amplitude, back to the first interaction gap at the output section. It is believed that each of the peaks in the gain characteristic of the tube is associated with an integral number of full wave lengths around the feedback path along the circuit from the output gap of the tube to each one of the successive upstream interaction gaps of the output slow wave circuit section.

These frequency sensitive fluctuations in the gain of the tube produce a non-linearity in the gain characteristic causing unwanted cross talk when the tube is utilized for amplifying signals over a pass band containing a number of separate channels.

Therefore, a need exists for a relatively simple and inexpensive arrangement for reducing the gain fluctuations over the pass band of the tube to reduce cross talk in the output of the amplifier tube.

SUMMARY OF THE PRESENT INVENTION

The principal object of the present invention is the provision of an improved traveling wave tube amplifier.

One feature of the present invention is the provision, in a traveling wave tube amplifier, of a wave reflective gain control element disposed near the upstream end of a slow wave circuit portion of the tube for reflecting a portion of a backward traveling wave on the slow wave circuit back along the circuit in the forward direction for controlling the gain of the tube.

Another feature of the present invention is the same as the preceding feature wherein the wave reflective element is positioned and dimensioned to produce a reflected wave which substantially reduces variations in the gain of the tube over the pass band of the tube, whereby cross talk in the output of the amplifier tube is substantially reduced.

Another feature of the present invention is the same as any one or more of the preceding features wherein the slow wave circuit comprises a plurality of coupled cavity resonators said resonators each having a beam-field interaction gap and wherein the wave reflective gain control element is positioned substantially at the interaction gap of the upstream cavity resonator of the slow wave circuit, whereby the gain control element is caused to have wide band operation.

Another feature of the present invention is the same as the preceding feature wherein the upstream cavity resonator, containing the wave reflective gain control element, is disposed at the severed end of an output slow wave circuit portion, and wherein each of the coupled cavity resonators of the slow wave circuit portion is dimensioned and arranged to provide more than 1.5 db of gain per coupled cavity section.

Other features and advantages of the present invention will become apparent upon a perusal of the following specification taken in connection with the accompanying drawings wherein:

DESCRIPTION OF THE PREFERRED EMBODIMENTS

Figure 1:
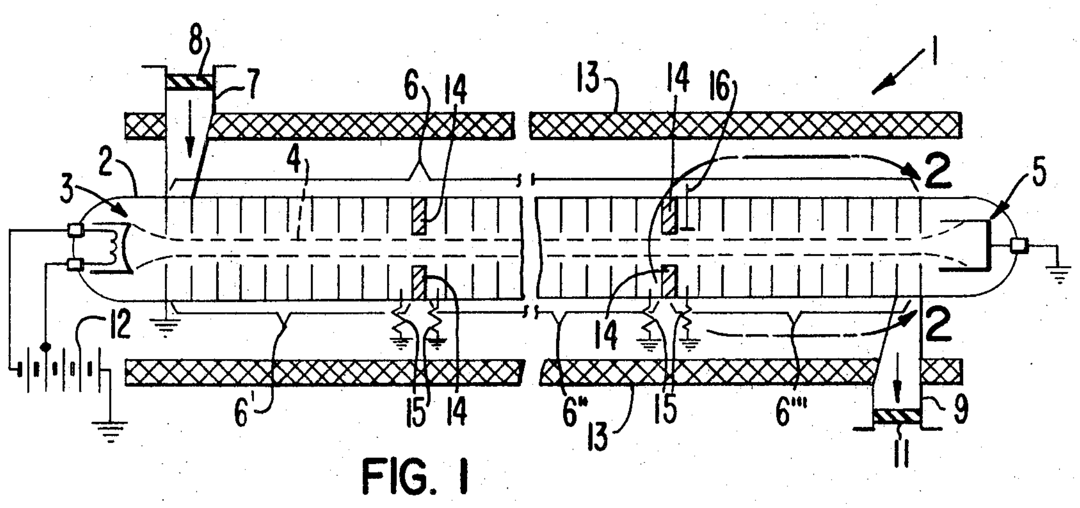
FIG. 1 is a schematic longitudinal sectional line diagram of a traveling wave tube amplifier incorporating features of the present invention.
Figure 2:
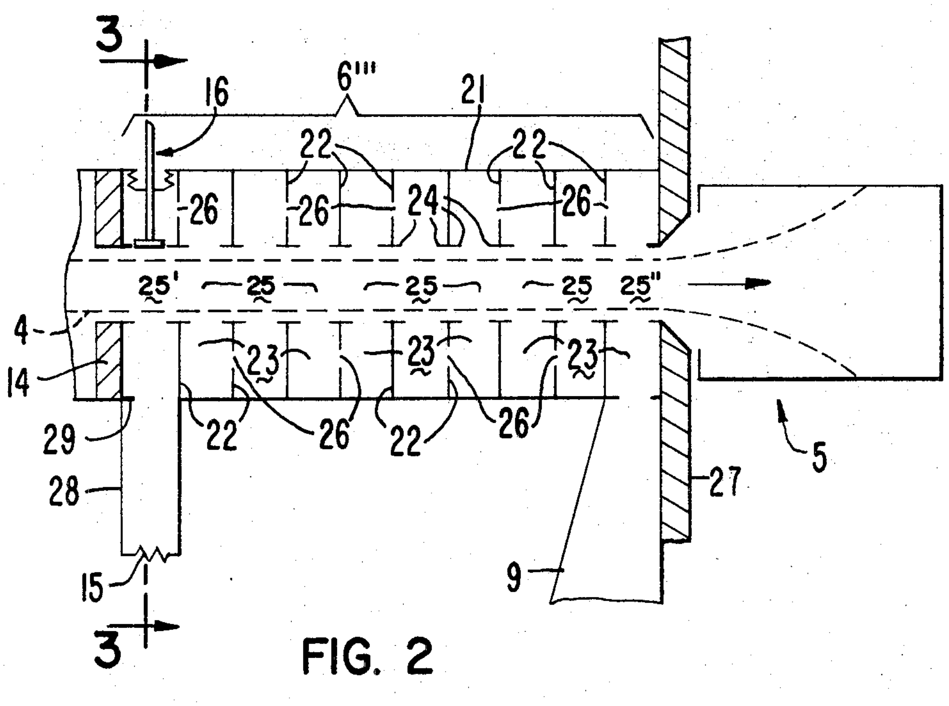
FIG. 2 is an enlarged schematic view of a portion of the structure of FIG. 1 delineated by line 2—2.
Figure 3:
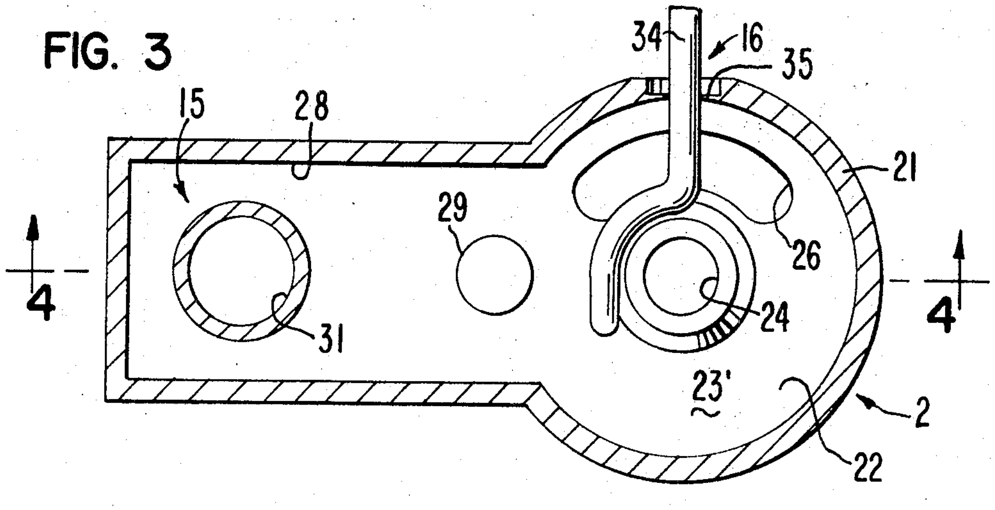
FIG. 3 is an enlarged sectional view of a portion of the structure of FIG. 2 taken along line 3—3 in the direction of the arrows.
Figure 4:
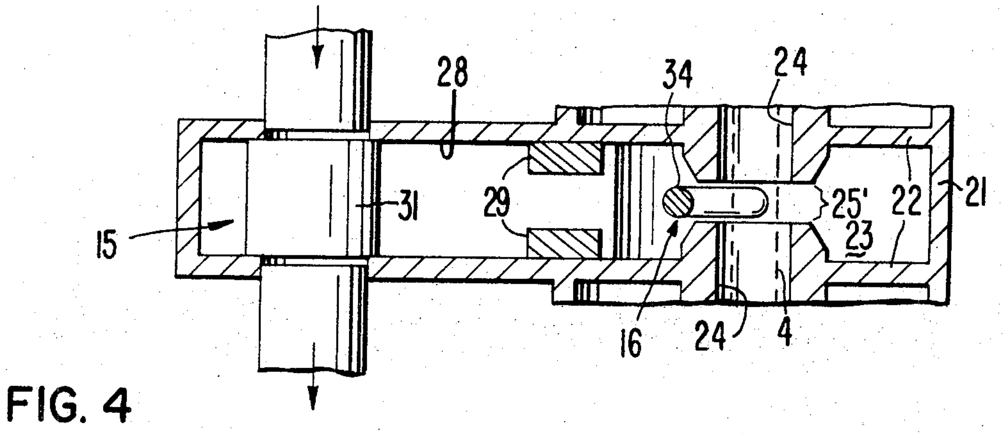
FIG. 4 is an enlarged sectional view of a portion of the structure of FIG. 3 taken along line 4—4 in the direction of the arrows.

Referring now to FIG. 1, there is shown a microwave traveling wave tube amplifier 1 incorporating features of the present invention. The amplifier tube 1 includes an elongated vacuum envelope structure 2 having an electron gun assembly 3 mounted at one end for forming and projecting a beam of electrons 4 over an elongated beam path to a collector structure 5 disposed at the opposite end of the envelope 2. A periodic slow wave circuit 6 is contained within the envelope 2 intermediate the electron gun 3 and the beam collector 5 for cumulative electromagnetic interaction with the electron stream 4 to produce an amplified output signal. The signal to be amplified is applied to the upstream end of the slow wave circuit 6 via an input waveguide 7 having a wave permeable vacuum tight window 8 sealed thereacross. The amplified output microwave signal is extracted from the downstream end of the slow wave circuit 6 via an output waveguide 9 having a wave permeable vacuum tight window structure 11 sealed thereacross. The output signal is fed to a suitable utilization device or load, not shown.

A power supply 12 supplies suitable operating potentials to the electron gun assembly 3 relative to the potential of the envelope 2, slow wave circuit 6, and beam collector structure 5 which latter electrodes are typically operated at ground potential. A beam focus solenoid 13 surrounds the envelope 2 for producing an axially directed beam focusing magnetic field for confining the beam to the beam path on the axis of the envelope 2.

The slow wave circuit 6 is preferably formed by a plurality of coupled cavity sections successively arranged along the beam path. The slow wave circuit is preferably severed by circuit severs 14, thereby dividing the circuit 6 into three severed slow wave circuit portions 6' 6'', and 6'''. Resistive terminations 15 are provided for terminating each of the severed slow wave circuit sections 6', 6'', and 6''' adjacent the circuit severs 14. A wave reflective gain control element 16, more fully described below, is positioned in the upstream coupled cavity section of the output severed slow wave circuit portion 6'''.

In operation, signals to be amplified are applied to the tube 1 via input waveguide 7. The input signals interact with the electron stream 4 in the first severed circuit portion 6' to produce bunching of the beam 4. The bunched beam couples energy into the second severed circuit portion 6'' for exciting a wave on the second severed circuit portion 6''. The wave in second section 6'' cumulatively interacts with the electron stream to produce further bunching and gain. The bunched beam is then passed into the output severed circuit portion 6''' for exciting an amplified circuit wave on the output section 6'''. The output wave is extracted from the downstream end of the severed circuit portion 6''' via output waveguide 9 and coupled to a suitable utilization device, not shown.

In a typical example of the tube of FIG. 1, the tube produces 8 kilowatts of CW power over an operating band from 5.925 to 6.425 gigahertz with a gain of approximately 40 db minimum over the band. In a typical example, the first severed portion of the circuit 6' includes 6 coupled cavity resonators, the second severed circuit portions 6'' includes 9 cavity resonators, and the final output section 6''' includes 10 cavity resonators.

Referring now to FIGS. 2–5 the structure and mode of operation of the output severed circuit portion 6''' will be described in greater detail. The severed slow wave circuit section 6''' includes a hollow cylindrical conductive barrel 21, as of copper, having a plurality of conductive discs 22 transversely mounted therewithin to define a plurality of cavtiy resonator sections 23 in the interior spaces between the discs 22. The discs 22 are centrally apertured in axial alignment with the beam path 4 to allow passage of the beam through the output slow wave section 6'''. Axially directed re-entrant drift tube sections 24, as of copper, project into each of the cavity resonator sections 23 from the discs 22 to define interaction gaps 25 in the spaces between the mutually opposed re-entrant drift tube sections 24. Each of the transverse discs 22 includes an inductive coupling iris 26 communicating therethrough between adjacent resonators 23. The coupling irises 26 are disposed on alternate sides of the beam in adjacent conductive discs 22. A centrally apertured collector pole piece 27 as of soft iron is disposed at the downstream end of the severed output slow wave circuit section 6''' for collecting the beam focus magnetic field and permitting the beam to expand into the collector structure 5.

This type of slow wave circuit 6 is described in greater detail in a book titled, "Traveling-Wave Tubes" by J. R. Pierce, Van Nostrand (1950), see page 61, FIG. 4.11. Briefly, the slow wave circuit 6''' has a fundamental backward wave dispersion characteristic and is operated on the first forward wave space harmonic with a phase shift per period of the slow wave circuit falling within the range of $\pi$ to $2\pi$ radians.

The slow wave circuit section 6''' provides a gain per cavity section 23 within the range of 2 to 3 db. The upstream cavity 23' of the output section 6''' has a section of rectangular waveguide 28 coupled thereto via a capacitive coupling iris 29. A hollow cylindrical dielectric window member 31 is sealed at its ends to the broad walls of the waveguide 28 and a lossy fluid, as of water, is piped axially through the center of the hollow cylindrical window 31 for absorbing wave energy coupled from the upstream cavity 23' via the iris 29 and waveguide 28 into the lossy fluid. The lossy fluid within the waveguide section 28 forms the resistive termination 15 and is substantially non-reflective for wave energy within the pass band of the slow wave circuit section 6'''.

It is found that when the output section 6''' is terminated in a non-reflective load at the output end and terminated by a non-reflective load 15 at its severed end, the gain characteristics has N−1 peaks over the pass band of the slow wave circuit 6''' where N is the number of coupled cavities 23. A few of these peaks occur within the operating band of the circuit 6''' and are indicated by curve 32 of FIG. 5. These peaks in the gain characteristic constitute a non-linearity producing cross talk between signals in adjacent frequency channels being amplified by the tube. It is believed that this variation in the gain characteristic is caused by feedback of signal wave energy from the output gap 25'' of the output circuit section 6''' to the upstream interaction gaps 25' due to a certain faction of the output signal being coupled back and traveling in the backward direction, i.e., in a direction contra to the direction of travel of the electron stream, along the coupled cavity circuit 6'''. The backward wave also results because of the discrete nature of the coupled cavity interaction. The wave can be set up at any gap or any mismatch. The peaks in the gain characteristic 32 are believed to occur one for each integral number of electrical wavelengths taken along the interaction circuit 6''' between the output gap 25'' and the upstream gap 25'.

It has been found that the variations in the gain characteristic can be substantially reduced by providing a wave reflective gain control element 16 disposed substantially at the upstream interaction gap 25' of the output section 6'''. When it is desired to reduce the fluctuations in the gain characteristic due to the feedback of the backward traveling wave, the wave reflective element is dimensioned and arranged to produce a wave reflection which cancels the backward traveling wave on the circuit 6'''.

Figure 5:
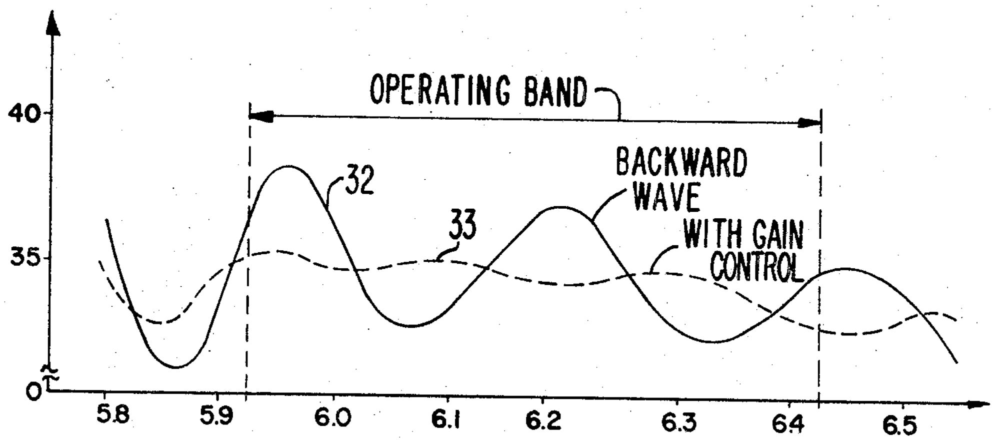
FIG. 5 is a plot of gain in db versus frequency in gigahertz for a traveling wave tube amplifier of FIGS. 1–4 and depicting the gain characteristic over the operating band with and without the provision of the reflective gain control element.

When the wave reflection from the discontinuity 16 just cancels the backward traveling wave, the gain characteristic is substantially flattened to that as indicated by the dotted line 33 of FIG 5. In this manner, the cross talk is substantially eliminated over the operating band of the tube.

The wave reflective gain control element 16 preferably comprises a conductive rod 34 as of stainless steel which passes through a deformable diaphragm portion 35 of the envelope 2. The rod 34 is curved at its inner end to pass around the electron beam 4 closely adjacent the interaction gap 25. In this manner, the wave reflection produced by the conductive rod 34 is introduced substantially at the interaction gap 25 such that the wave reflection is introduced substantially at the same point at which the backward wave feedback is introduced into the beam. By introducing the reflection substantially at the point at which the unwanted feedback is introduced into the beam, the frequency dependent adjustment of the gain produced by the gain control electrode element 16 has maximum bandwidth. Actually, the gain control element 16 may be positioned at a number of positions near the upstream end of the circuit section 6''', for example, in the waveguide section 28 or in the first two or three cavities at the upstream end of the severed circuit section 6'''. However, when the wave reflective gain control element 16 is provided at points which are not precisely at the interaction gap 25', the operating bandwith of the gain control element is substantially reduced. In fact, the further away that the reflective element 16 is placed from the upstream interaction gap 25' the more narrow band the effect of the gain control element.

The diaphragm 35 permits adjustment of the rod 34 to obtain the right magnitude and phase of the reflected wave to just cancel the feedback effect to obtain maximum flatness of the gain characteristic over the operating band of the tube. Once the rod 34 has been properly adjusted it may be sealed into that position by epoxy cement or by a suitable lock nut arrangement, not shown. The rod 16 will not require further adjustment during the operating life of the tube and is preferably preset at the factory.

In a typical example of the tube as aforedescribed and operating within the frequency band from 5.925 to 6.425 gigahertz, the conductive rod 34 had a diameter of approximately 0.060" and the interaction gap 25' had a width of approximately 0.055".

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a traveling wave tube amplifier, means for forming and projecting a stream of electrons over an elongated beam path, means forming a periodic slow wave circuit arranged along the electron stream for electromagnetic interaction between a forward traveling wave on said circuit and the stream of electrons to produce an amplified output signal on said circuit, means at the downstream end of said slow wave circuit forming an output terminal for extracting the amplified output signal for transmission to a suitable load, the improvement comprising, means at the upstream end of said slow wave circuit forming, at frequencies within the operating band of said tube, a wave reflective discontinuity for reflecting a portion of a backward traveling wave on said slow wave circuit back along said circuit in the forward direction to cause at least partial cancellation of said backward wave.

2. The apparatus of claim 1 wherein said slow wave circuit comprises a plurality of coupled cavity resonators, said cavity resonators each having a pair of axially aligned beam coupling holes therein for passage of the beam through each cavity resonator and for defining an interaction gap therebetween in each cavity resonator, means forming a resistive load coupled to the upstream cavity resonator of said coupled cavity circuit to form a non-wave reflective resistive termination for absorbing backward traveling waves reaching the upstream end of said slow wave circuit.

3. The apparatus of claim 2 wherein said wave reflective discontinuity is positioned substantially at the interaction gap of said upstream cavity resonator.

4. The apparatus of claim 3 wherein said wave reflective discontinuity is an electrically conductive rod.

5. The apparatus of claim 4 wherein said coupled cavity slow wave circuit is dimensioned and arranged to provide more than 1.5 db of gain per coupled cavity resonator.

References Cited

UNITED STATES PATENTS

| | | | |
|---|---|---|---|
| 2,999,182 | 9/1961 | Field | 315—3.6 |
| 3,123,736 | 3/1964 | Christoffers et al. | 315—3.6 |
| 3,200,286 | 8/1965 | Rorden | 315—3.5 |
| 3,221,204 | 11/1965 | Hant et al. | 315—3.5 |
| 3,250,946 | 5/1966 | Dechering et al. | 315—3.5 |

HERMAN K. SAALBACH, Primary Examiner

S. CHATMON, Jr., Assistant Examiner

U.S. Cl. X.R.

315—393; 330—43